(12) United States Patent
Chapman

(10) Patent No.: US 11,608,578 B1
(45) Date of Patent: Mar. 21, 2023

(54) AUTOMATED LAUNDRY SYSTEM AND METHOD

(71) Applicant: Wade Chapman, Thomasville, GA (US)

(72) Inventor: Wade Chapman, Thomasville, GA (US)

( * ) Notice: Subject to any disclaimer, the term of this patent is extended or adjusted under 35 U.S.C. 154(b) by 344 days.

(21) Appl. No.: 17/122,279

(22) Filed: Dec. 15, 2020

Related U.S. Application Data

(60) Provisional application No. 62/949,384, filed on Dec. 17, 2019.

(51) Int. Cl.
| | |
|---|---|
| *G06F 3/048* | (2013.01) |
| *D06F 31/00* | (2006.01) |
| *D06F 95/00* | (2006.01) |
| *D06F 29/00* | (2006.01) |
| *G06Q 20/18* | (2012.01) |
| *G06Q 20/20* | (2012.01) |
| *G06Q 50/28* | (2012.01) |
| *D06F 34/34* | (2020.01) |
| *G06F 3/0484* | (2022.01) |
| *D06F 105/52* | (2020.01) |
| *D06F 101/20* | (2020.01) |
| *D06F 103/34* | (2020.01) |
| *D06F 105/24* | (2020.01) |
| *B65G 15/28* | (2006.01) |
| *B61B 13/00* | (2006.01) |
| *G06F 3/0482* | (2013.01) |

(52) U.S. Cl.
CPC .......... *D06F 31/00* (2013.01); *D06F 29/005* (2013.01); *D06F 34/34* (2020.02); *D06F 95/002* (2013.01); *G06Q 20/18* (2013.01); *G06Q 20/204* (2013.01); *G06Q 50/28* (2013.01); *B61B 13/00* (2013.01); *B65G 15/28* (2013.01); *D06F 2101/20* (2020.02); *D06F 2103/34* (2020.02); *D06F 2105/24* (2020.02); *D06F 2105/52* (2020.02); *G06F 3/0482* (2013.01); *G06F 3/0484* (2013.01)

(58) Field of Classification Search
CPC ........ D06F 31/00; D06F 34/34; D06F 29/005; D06F 95/002; D06F 2103/34; D06F 2105/52; D06F 2101/20; D06F 2105/24; G06Q 20/18; G06Q 20/204; G06Q 50/28; B61B 13/00; B65G 15/28; G06F 3/0482; G06F 3/0484
See application file for complete search history.

(56) References Cited

U.S. PATENT DOCUMENTS

| | | | |
|---|---|---|---|
| 1,220,308 A | 3/1917 | Young et al. | |
| 1,584,770 A | 4/1924 | Hurd | |

(Continued)

OTHER PUBLICATIONS

"Wonderwash", viewed at https://www.amazon com/Laundry-Alternative-Wonderwash-Non-electric-Portable/dp/B002C8HR9A?SubscriptionId=AKIAILSHYYTFIVPWUY6Q&tag=duckduckgo-exp-a-20&linkCode=xm2&camp=2025&creative=165953&creativeASIN=B002C8HR9A on Feb. 3, 2020.

(Continued)

*Primary Examiner* — David Phantana-angkool
(74) *Attorney, Agent, or Firm* — Law Office of Steven R. Olsen, PLLC; Steven R. Olsen

(57) ABSTRACT

In embodiments of the invention, cartridge bins of laundry are disposed into drums for continuous flow (progressive) laundry processing. Each drum is supported by a carriage; the carriage is configured to articulate the drum and to cooperate with a space-saving processing track.

17 Claims, 19 Drawing Sheets

(56) References Cited

U.S. PATENT DOCUMENTS

| | | | |
|---|---|---|---|
| 1,945,477 A | 11/1930 | Cimarik et al. | |
| 2,645,914 A | 6/1950 | Sessions | |
| 2,655,021 A | 10/1953 | Neher | |
| 4,232,486 A | 11/1980 | Rampe | |
| 7,418,521 B2 | 8/2008 | Schroeder et al. | |
| 7,987,540 B2 | 8/2011 | Schroeder et al. | |
| 10,356,650 B2 | 7/2019 | Dill et al. | |
| 10,458,054 B1* | 10/2019 | Hamilton | D06F 31/00 |
| 10,844,530 B2* | 11/2020 | Jones | D06F 29/005 |
| 2004/0000175 A1* | 1/2004 | Bolduan | D06F 17/04 68/17 R |
| 2018/0100262 A1* | 4/2018 | Prushinskiy | D06F 35/00 |
| 2018/0291545 A1* | 10/2018 | Jones | D06F 34/05 |
| 2020/0325610 A1* | 10/2020 | Chae | D06F 34/14 |
| 2020/0325617 A1* | 10/2020 | Chae | D06F 33/37 |
| 2021/0131005 A1* | 5/2021 | Magnusson | D06F 17/12 |
| 2022/0034019 A1* | 2/2022 | Daniels | C01B 13/10 |
| 2022/0081828 A1* | 3/2022 | Rabbani | D06F 39/088 |
| 2022/0098779 A1* | 3/2022 | Coney | D06F 95/00 |

OTHER PUBLICATIONS

"Tilting Washer Working Video", available at: https://www.youtube.com/watch?v=UPIEbxDaSEU, posted Feb. 11, 2015.

* cited by examiner

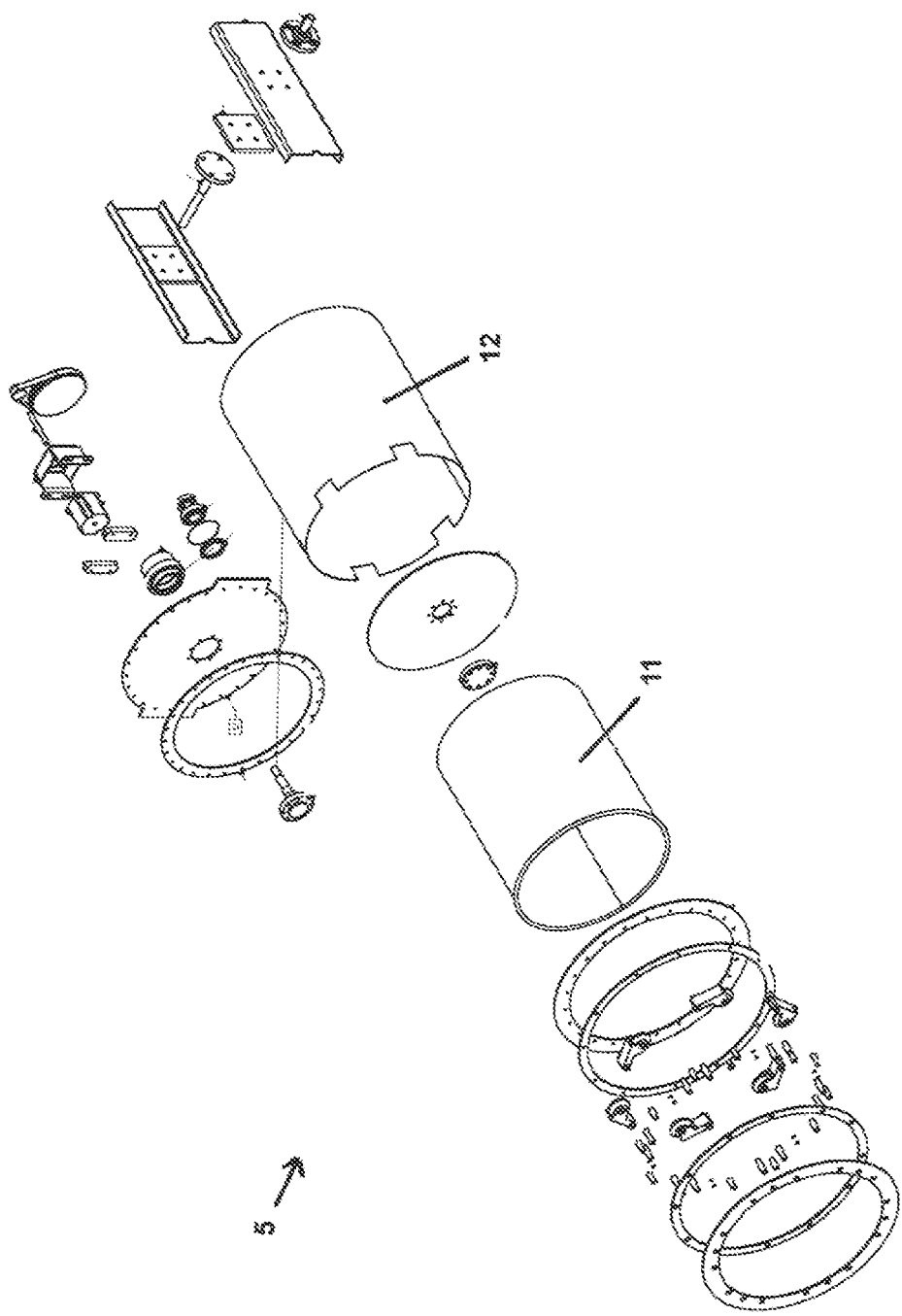

- tilting the washing drum (for instance at an angle 30-45 degrees from horizontal to retain water)
- injecting water solution (quantity, temperature, and additives based on the user selections)
- agitating (inner drum + cartridge bin), rinsing, and high-speed spinning (inner drum + cartridge bin) based on the user selections
- [if appropriate based on the user selections] transporting the cartridge bin to a drying station via the washing drum, carriage, and track
- [if appropriate based on the user selections] coupling hot air to the washing drum
- begin low-speed tumble (inner drum + cartridge bin)
- decoupling hot air from the washing drum based on measured humidity
- transporting the cartridge bin to a discharge station via the washing drum, carriage, and track
- terminating the tumbling
- discharging the cartridge bin to the conveyor belt (to include tilting the washing drum)
- transporting the cartridge bin to storage via the conveyor belt
- notifying the user that laundry is complete
- receiving a laundry retrieval command from the user
- transporting the cartridge bin to the retrieval station via the conveyor belt

AUTOMATED LAUNDRY SYSTEM AND METHOD

CROSS-REFERENCE TO RELATED APPLICATIONS

This application claims the benefit of U.S. Provisional Application No. 60/94,384, filed 17 Dec. 2019.

BACKGROUND

Field of Invention

The invention relates generally to laundering clothes or other textiles. More specifically, but not by way of limitation, embodiments of the invention provide improvements in automated laundry systems and methods.

Description of the Related Art

Clothes laundering is generally accomplished via a predefined sequence of process steps, for instance: washing (often with presoak, followed by agitation in soapy water), rinsing (usually with spinning and draining), and drying. Typically, "washing machines" are used for washing and rinsing; "dryers" are used for drying. This separation in processing introduces certain inefficiencies association with manual transfer of laundry between washing machines and dryers. Such inefficiencies may be especially disadvantageous in commercial and institutional settings.

Systems and methods for continuous flow laundering of clothes or other textiles are known in the art. But such systems generally suffer from large floor space requirements, inefficient consumption of resources (water and power), and/or a lack of mechanisms and process controls for handling small batches. An improved laundering system and method is urgently needed.

SUMMARY OF THE INVENTION

The invention seeks to overcome one or more limitations of prior art laundry systems and methods noted above. In embodiments of the invention, cartridge bins of laundry are disposed into drums for continuous flow (progressive) laundry processing. Each drum is supported by a carriage; the carriage is configured to articulate the drum and to cooperate with a space-saving processing track.

DESCRIPTION OF THE DRAWINGS

Embodiments of the invention are illustrated in the drawings, wherein:

FIG. 11 is an exploded assembly view of a drum;
FIGS. 18A and 18B are a process flow diagram of a laundry process.

DETAILED DESCRIPTION

Figure 1:
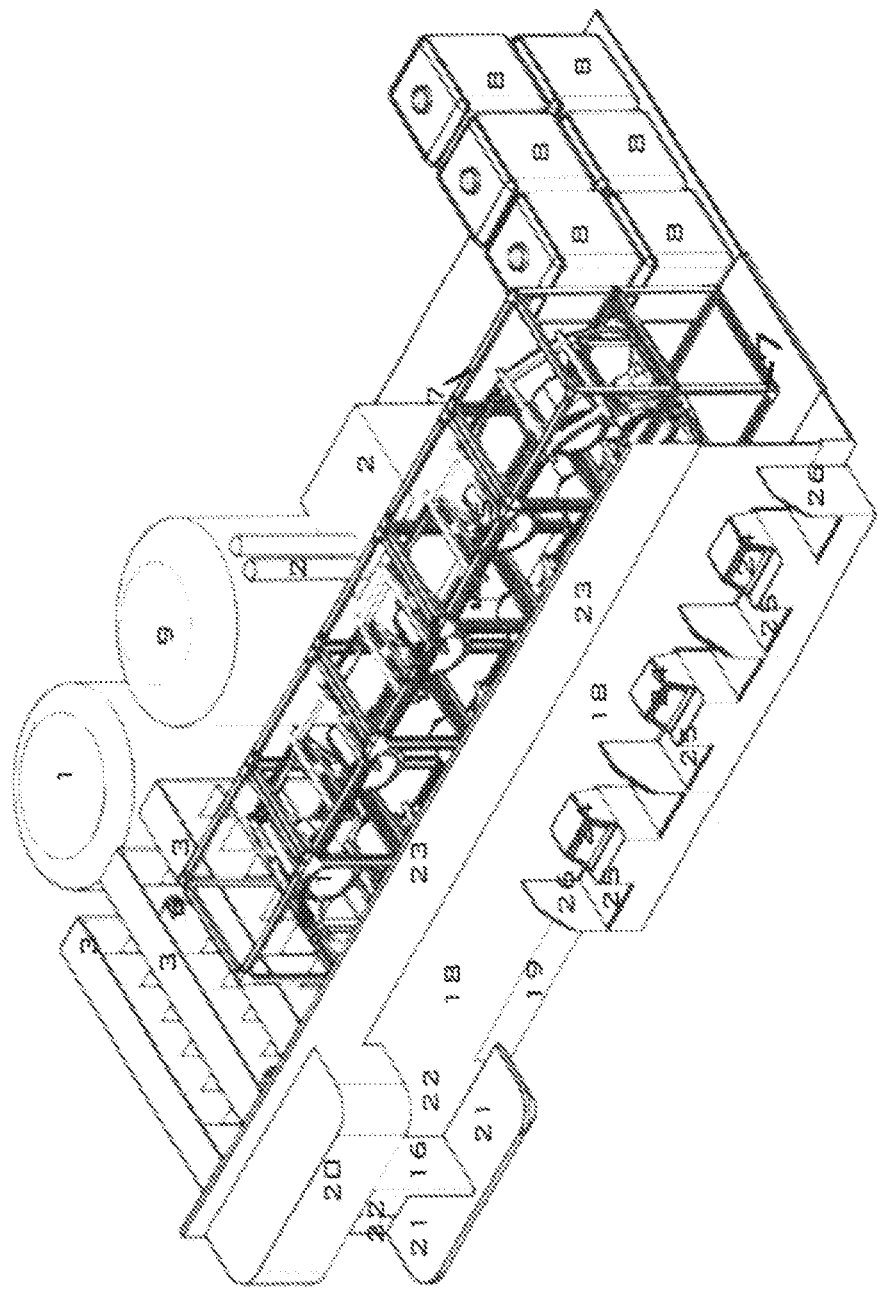
FIG. 1 is an isometric view of a laundry system.
Figure 2:
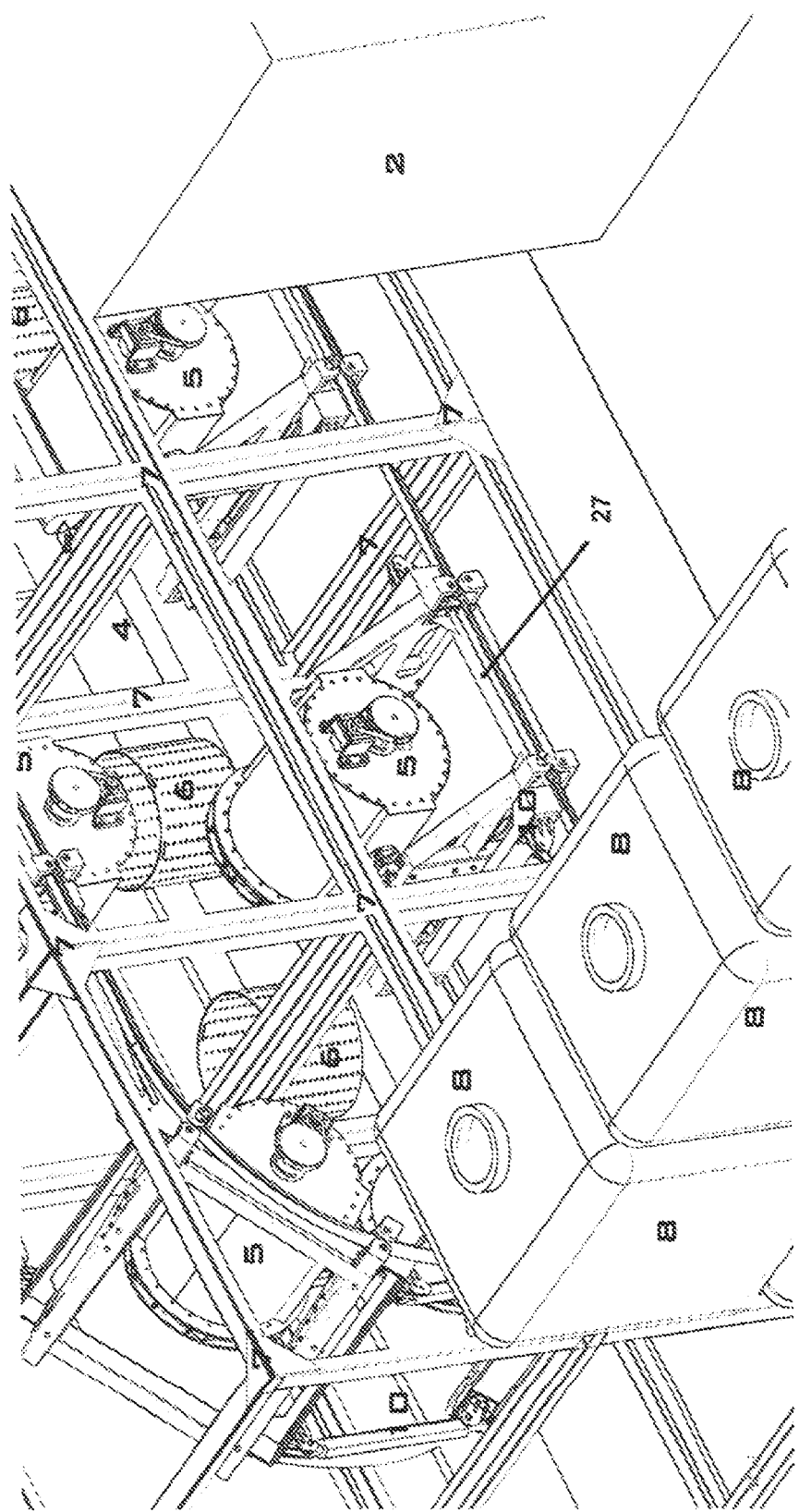
FIG. 2 is a rear isometric view of the laundry system.
Figure 3:
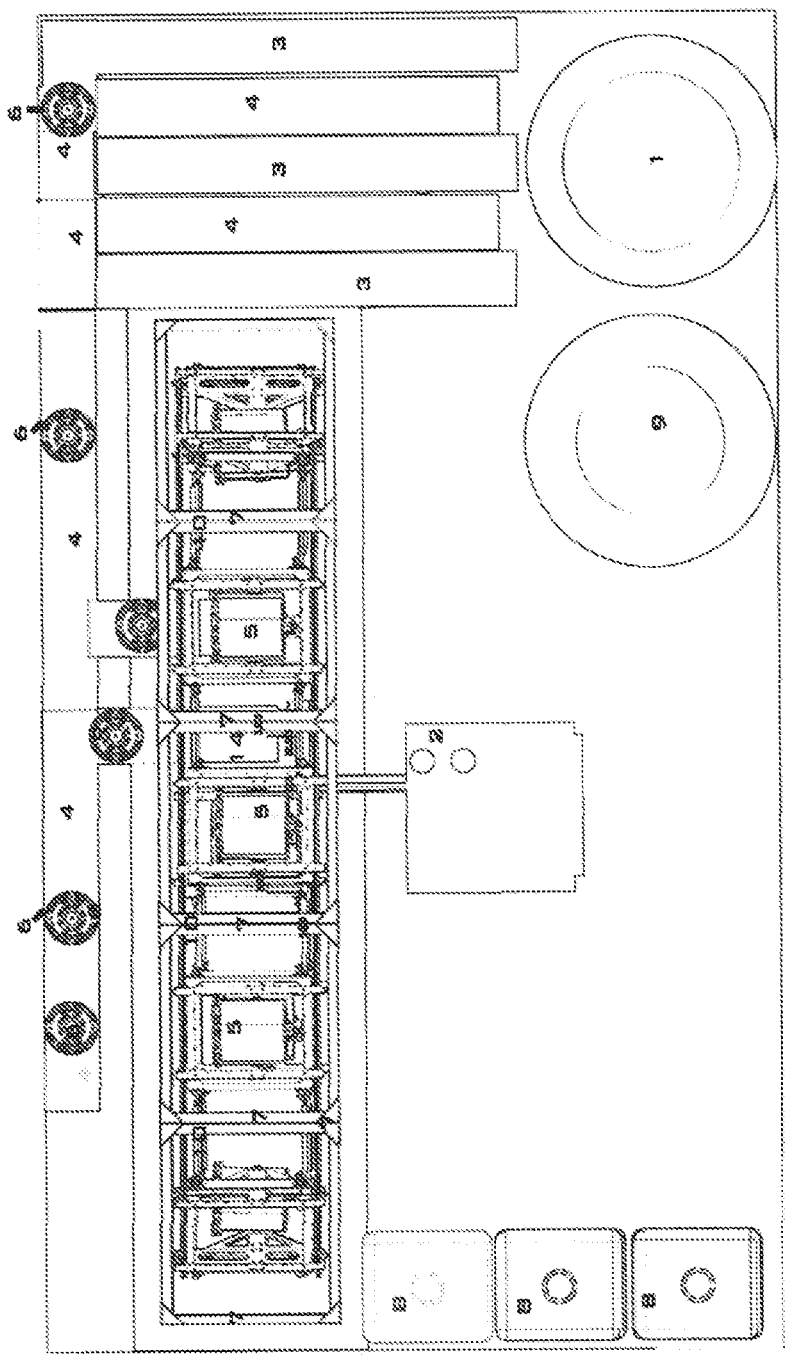
FIG. 3 is a top view of the laundry system.
Figure 4:
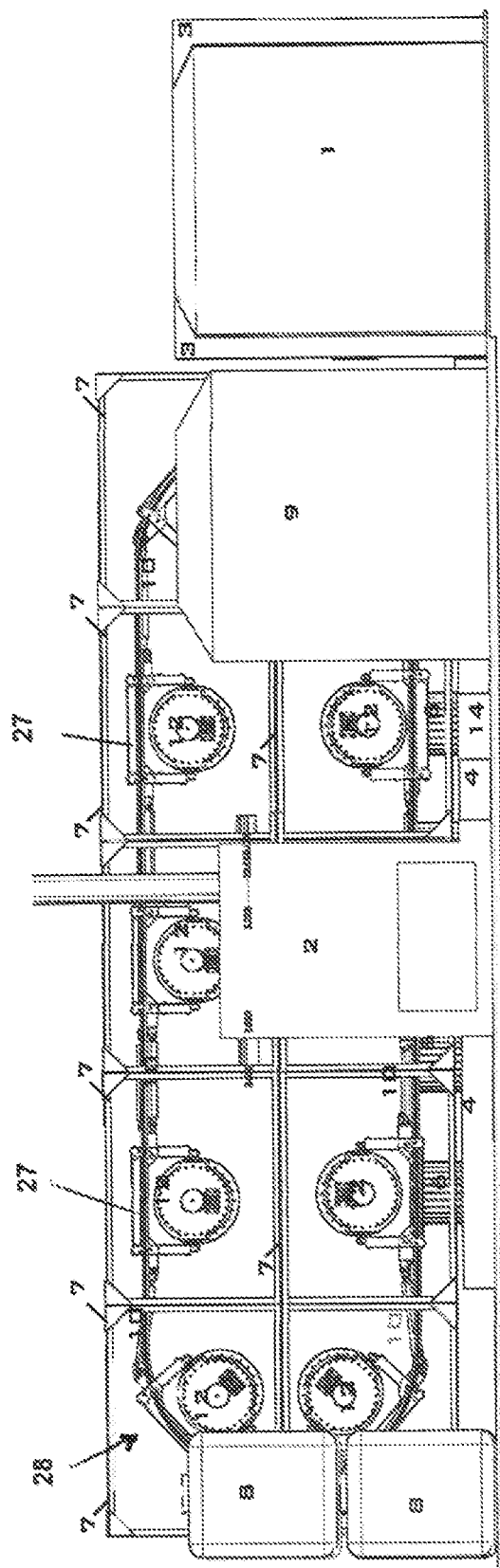
FIG. 4 is a rear elevation view of the laundry system.
Figure 5:
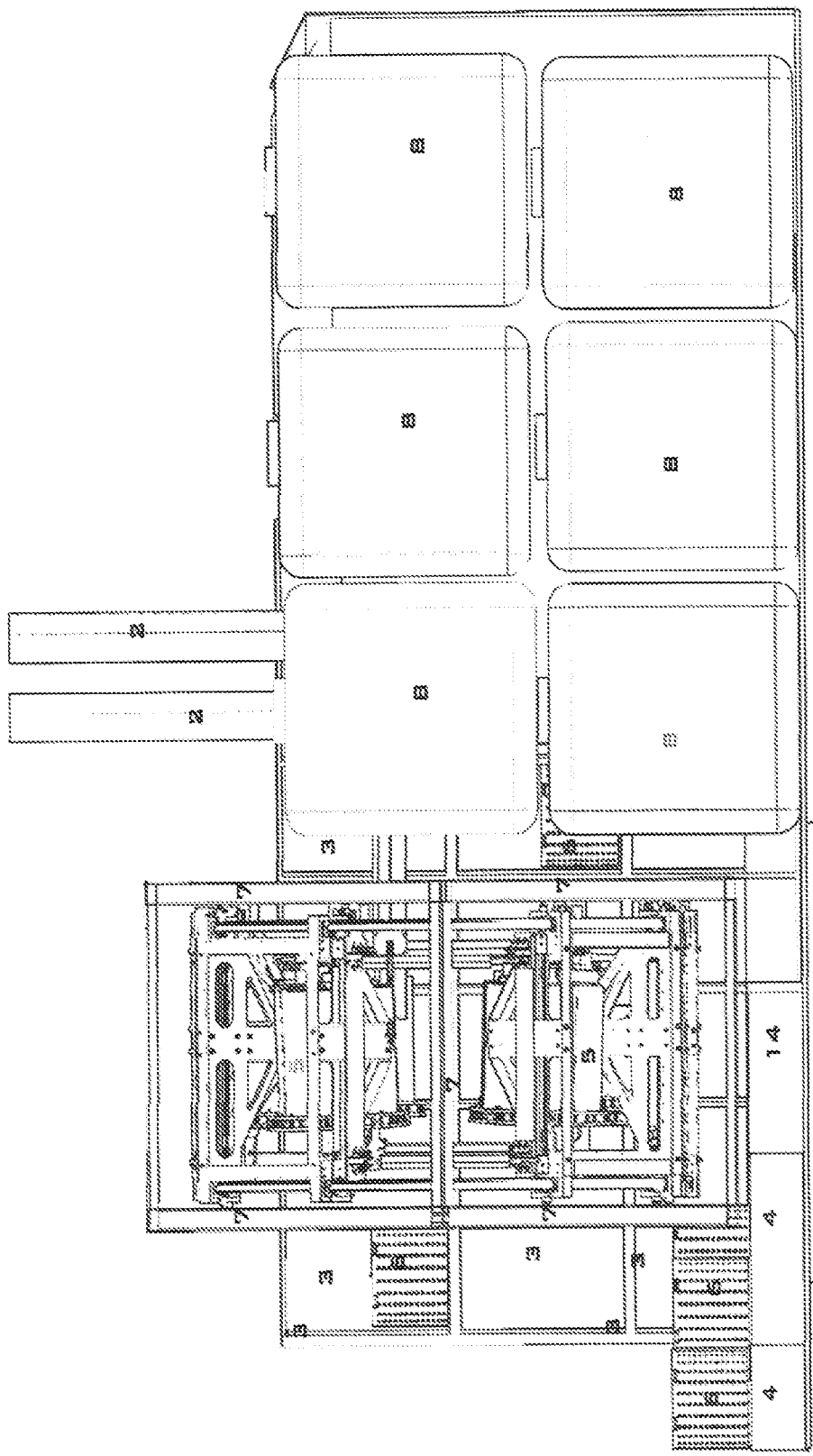
FIG. 5 is a right end elevation view of the laundry system.
Figure 6:
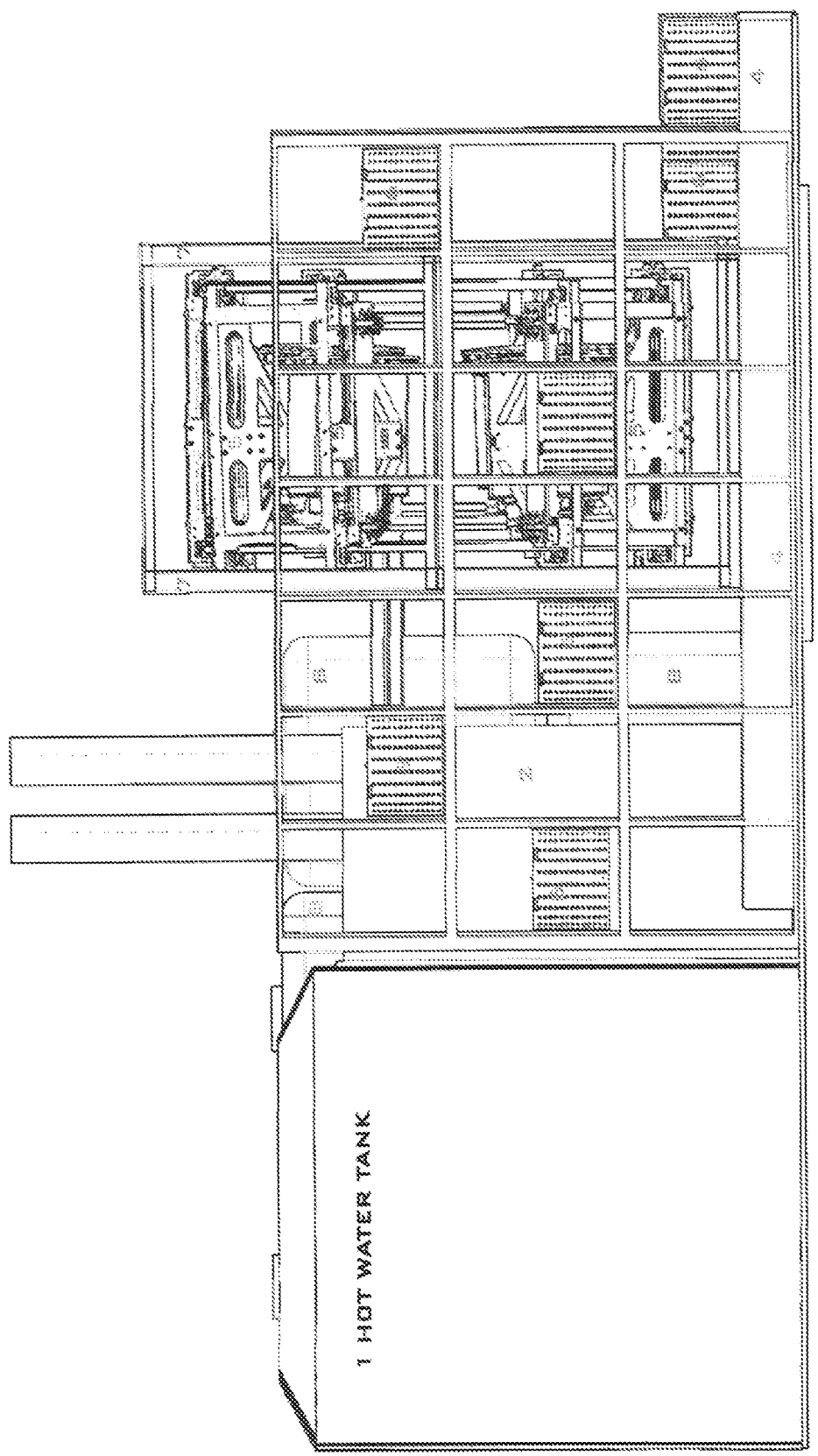
FIG. 6 is a left end elevation view of the laundry system.
Figure 7:
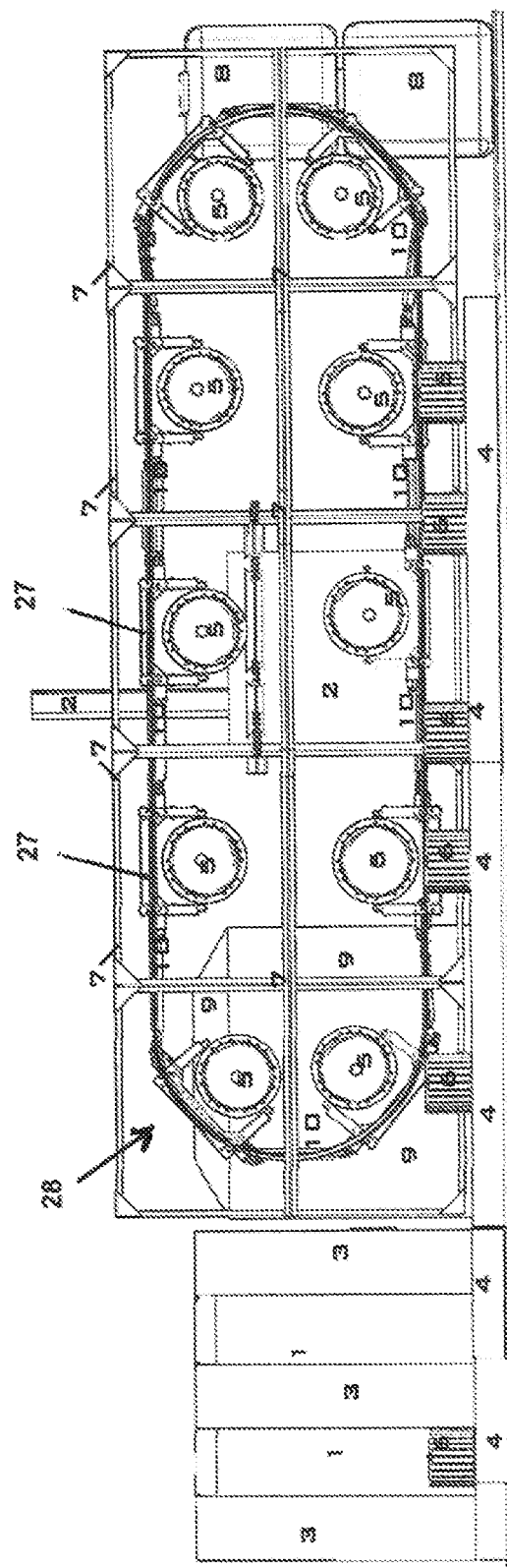
FIG. 7 is a front elevation view of the laundry system.
Figure 8:
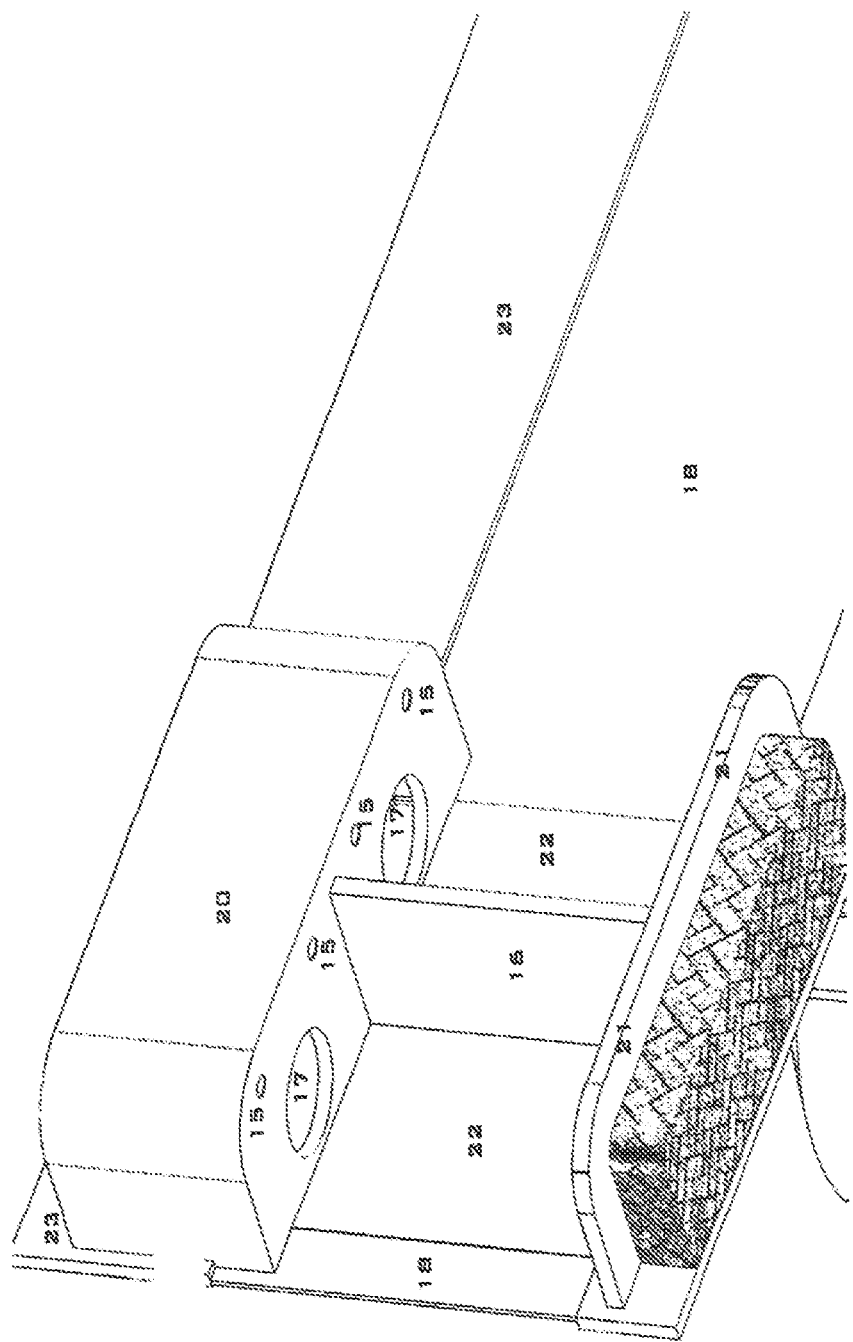
FIG. 8 is an isometric view of a laundry retrieval station.
Figure 9:
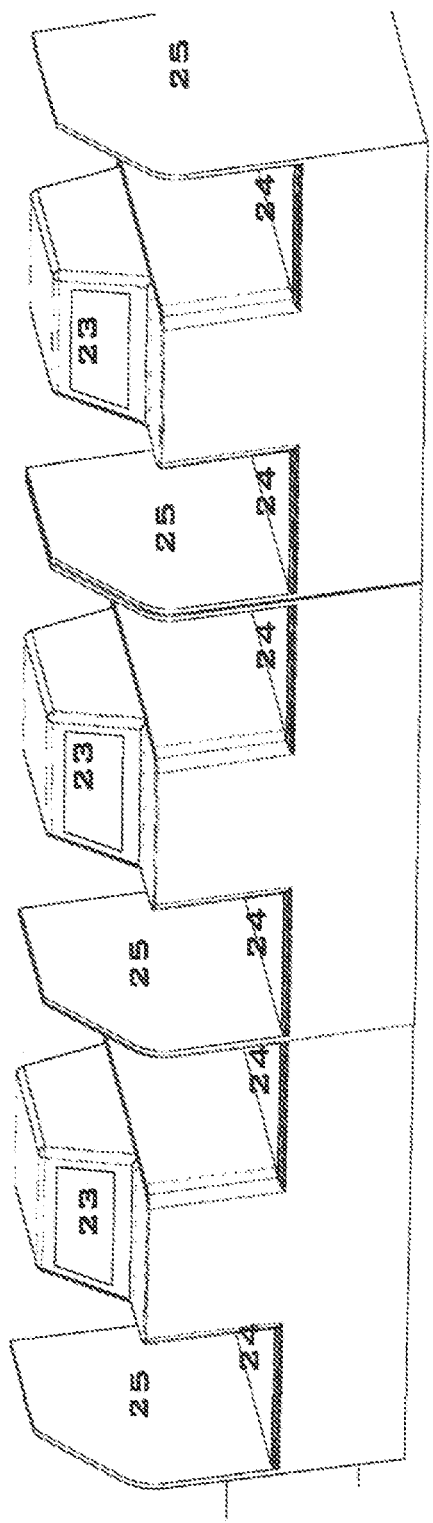
FIG. 9 is an isometric view of a customer loading kiosk.
Figure 10B:
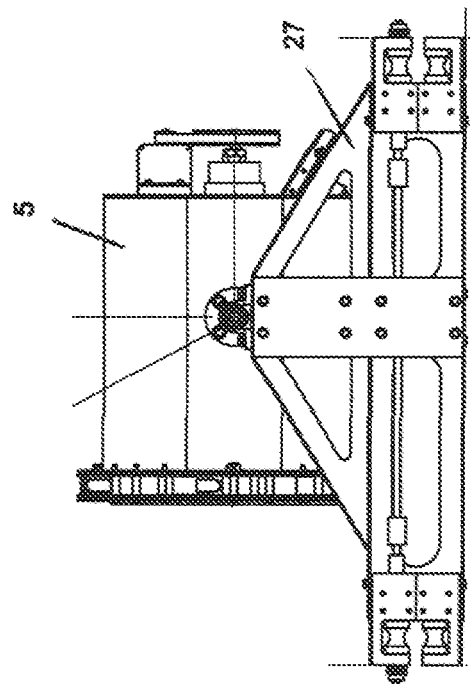
FIG. 10B is a side view of a drum and carriage assembly.
Figure 10A:
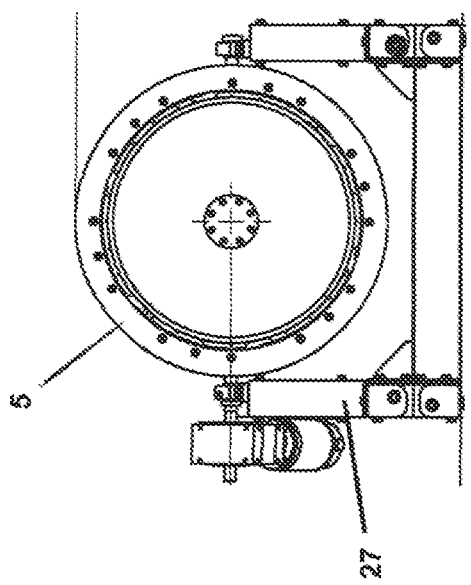
FIG. 10A is an end view of a drum and carriage assembly.
Figure 12:
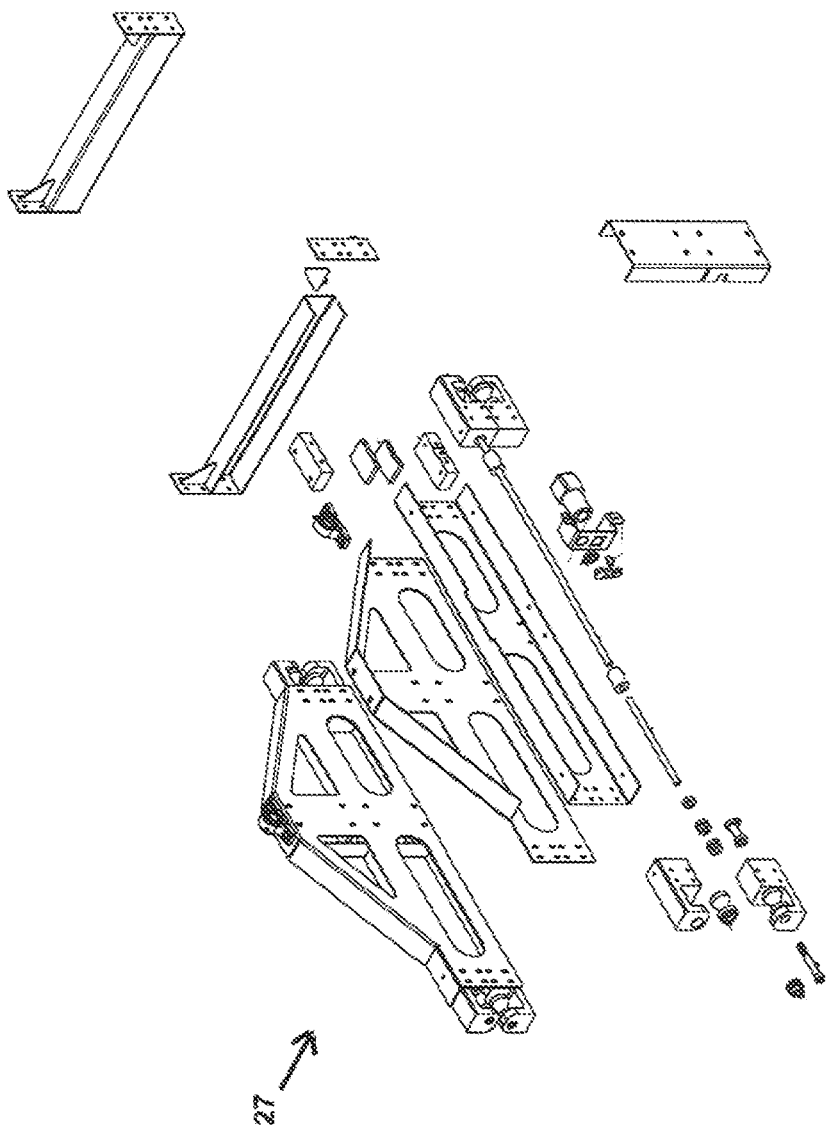
FIG. 12 is an exploded assembly view of a carriage.

This section describes embodiments of the invention with reference to FIGS. 1-18B. Such embodiments are meant to be illustrative and not restrictive. Dimensions are not implied. In the drawings, reference designators are generally reused for the same or similar features. Some features may be simplified, omitted, or not specifically referenced for descriptive clarity. Although sub-headings are used below for organizational convenience, disclosure of any particular feature is not necessarily limited to any section.

System Overview

With particular reference to FIGS. 1-9, an illustrative laundry system includes multiple cartridge bins 6 to contain clothing or other textile items; this facilitates controlled small-batch processing. The cartridge bins 6 are preferably cylindrical in shape, with one open end, and constructed with perforated walls, as shown. Each cartridge bin 6 may be stored in cartridge bin storage area 3, shuttled via smart independent conveyor belt 4, and loaded into a corresponding washing drum 5 via cartridge loading jack 14.

Washing drum frame 7 supports and contains an oval track 28. The oval track 28 is preferably disposed in a vertical orientation (as shown) to limit floor space. In embodiments of the invention, each washing drum 5 is supported by a self-driven carriage 27 (best illustrated in FIGS. 10A, 10B, and 12) to articulate the washing drum 5 (e.g., to tilt the drum with respect to a radial axis) and to also advance the washing drum 5 along the track 28 through a sequence of laundry processing stations. Hitch connecting assemblies 10 maintain spacing between successive carriages 27 on the track 28.

The illustrated embodiment includes several supporting laundry processing components, namely hot water tank 1, furnace 2, intermediate bulk container (IBC) detergent totes 8, cold water tank 9, and dryer hood assembly (not shown). The illustrated laundry system also includes a customer loading kiosk (illustrated in FIGS. 1 and 9, and including touch screen display 24, basket platform 25, and privacy wall 26) and a laundry retrieval station (illustrated in FIGS. 1 and 8, including lights 15, privacy wall 16, clothing dispensing hole 17, observation window 18, hood 20, basket table 21, window 22 and upper wall 23).

Variations to the laundry system embodiment illustrated in FIGS. 1-9 and described above are possible. For example, in alternative embodiments, the oval track 28 could be horizontally disposed rather than vertically disposed. Moreover, the customer loading kiosk and/or laundry retrieval station could be eliminated in a semi-automated environment, or reconfigured, according to application requirements. Conventional components such as hot water tank 1, furnace 2, IBC detergent totes 8, and/or cold water tank 9 could be repositioned according to design choice.

Drum and Carriage

FIGS. 10A, 10B, 11, and 12 illustrate additional details of the washing drum 5 and the carriage 27, according to an embodiment of the invention. Each washing drum 5 preferably includes a rotating inner drum 11 and a rotating outer drum 12 (nested cylinders, each having one open end). The cartridge bin 6 is configured to couple to the inner drum 11 during processing (a closed end of the cartridge bin 6 securing clothing or other textiles within the inner drum 11). The Inner drum 11 is configured to rotate about its longitudinal axis, for instance to support bi-directional agitation during a wash cycle, high-speed uni-directional rotation during a spin (water removal) cycle, and a low-speed unidirectional tumble during a drying cycle. Outer drum 12 (and thus the contained inner drum 11 as well) is configured to tilt about a radial axis, for example to retain water or discharge the cartridge bin 6 after processing.

Controls

Figure 13:
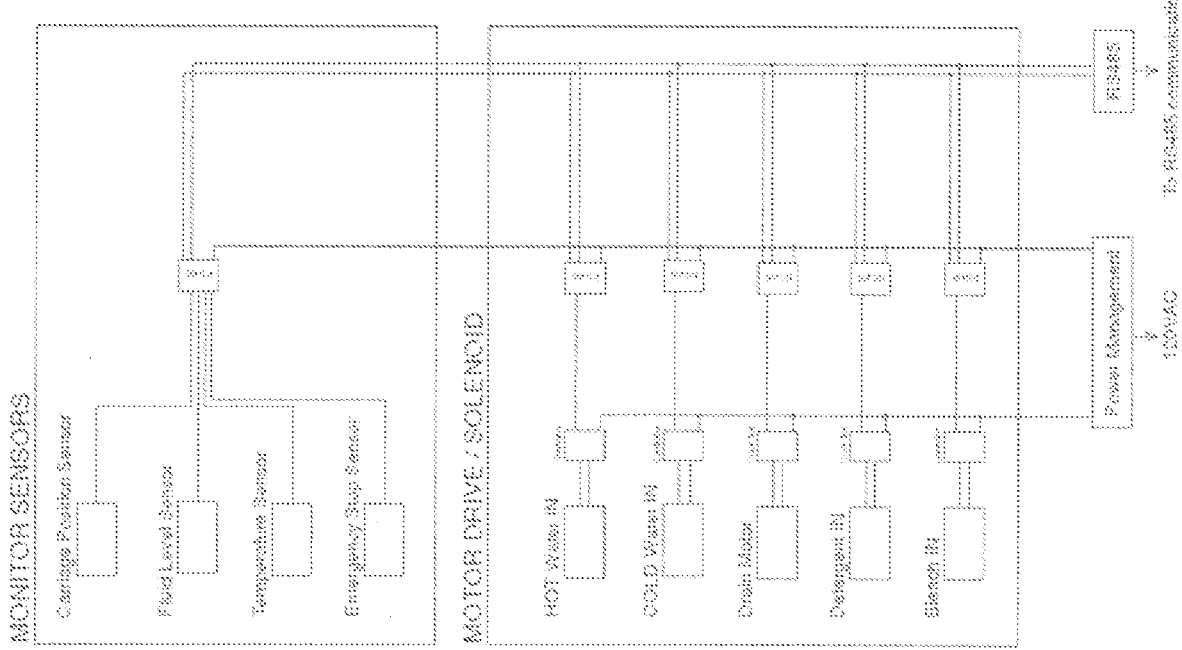
FIG. 13 is a sensor & control diagram for a washing station.
Figure 14:
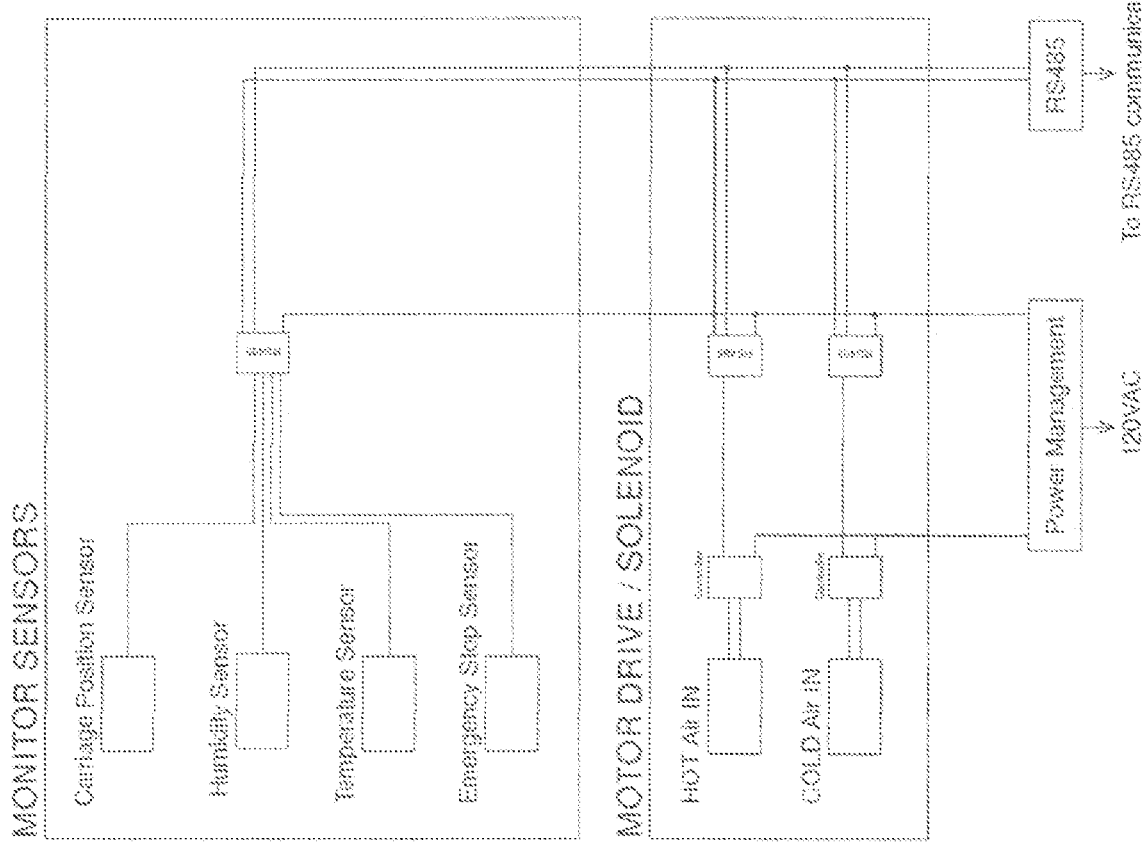
FIG. 14 is a sensor & control diagram for a drying station.
Figure 15:
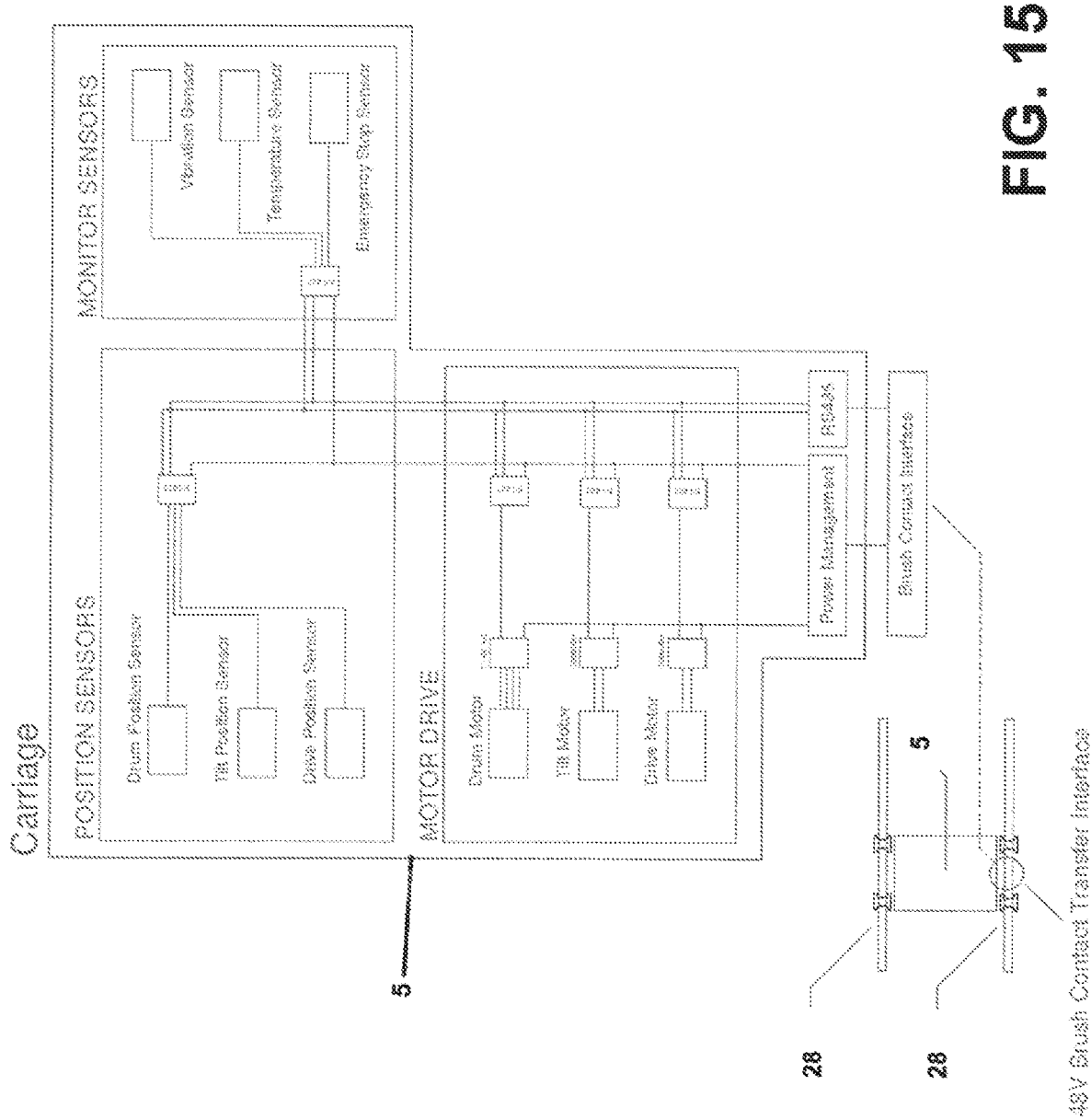
FIG. 15 is a sensor & control diagram for a carriage and drum.

FIG. 13 is a sensor & control diagram for a washing station disposed along the track 28; FIG. 14 is a sensor & control diagram for a drying station disposed along the track 28, and FIG. 15 is a sensor & control diagram for a carriage 27 and drum 5. "RS485" refers to a physical layer communications standard (also known as TIA-485 or EIA-485), but other suitable suitable physical connections and various communication protocols could also be used. For instance, in alternative embodiments, carriages 27 and other components could communicate via radio frequency (RF), free-space optical (FSO), or other wireless methods.

Figure 16:
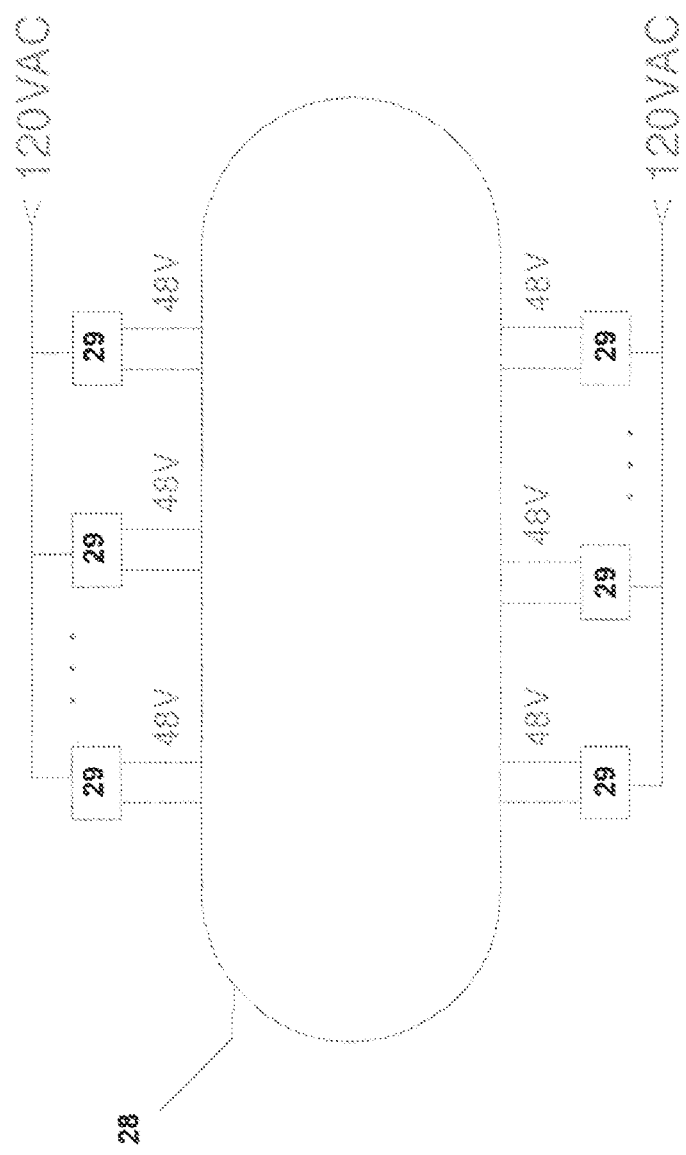
FIG. 16 is an electrical schematic diagram for a track.

Power distribution can be understood for the illustrated embodiment with reference to FIGS. 15 and 16. 48 VDC is supplied to the track 28 by multiple power supplies 29 that are each coupled to a 120 VAC source. Each carriage 27 uses a brush contact transfer interface to receive 48 VDC power from the track 28.

Figure 17:
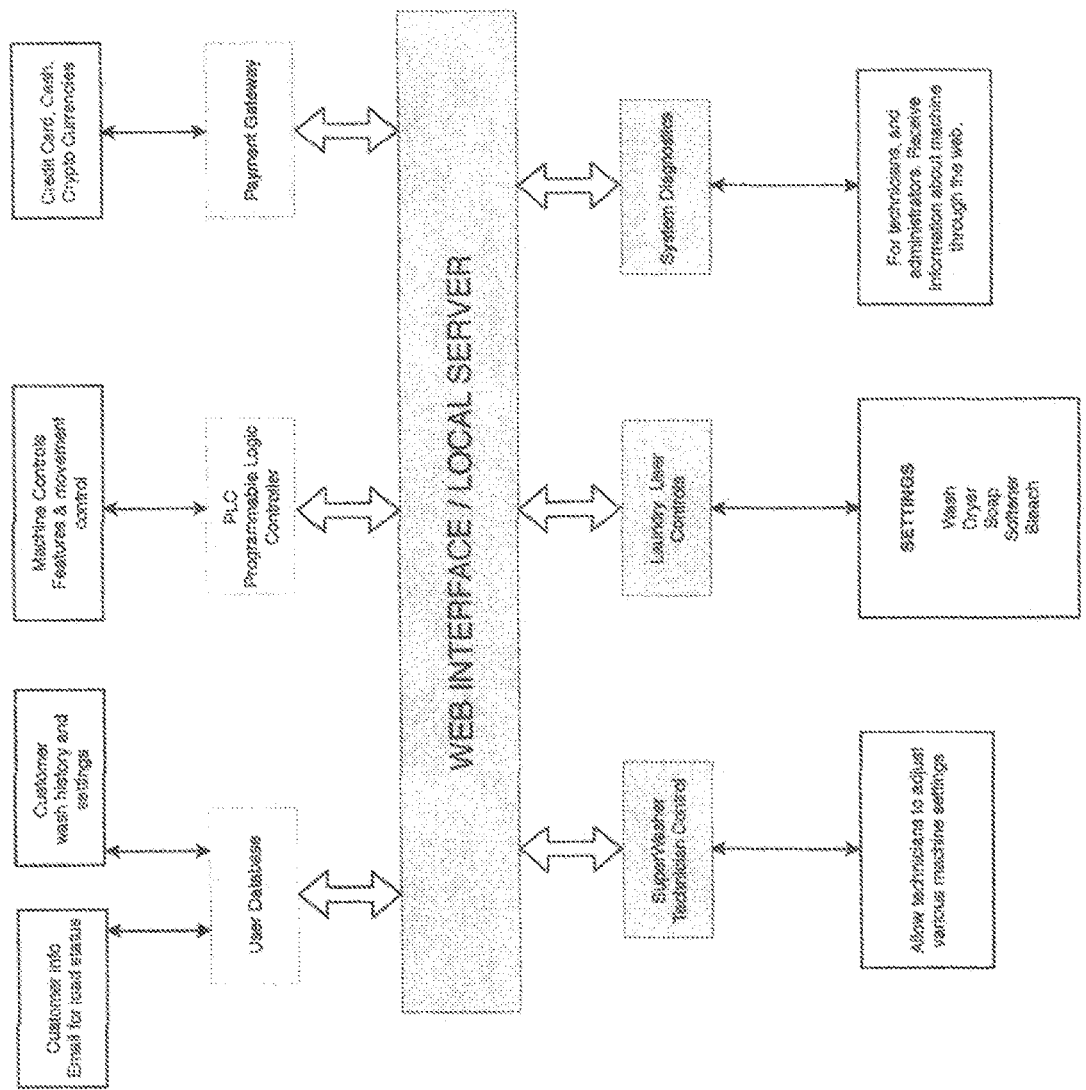
FIG. 17 is a functional block diagram for controlling the laundry system.
Figure 18A:
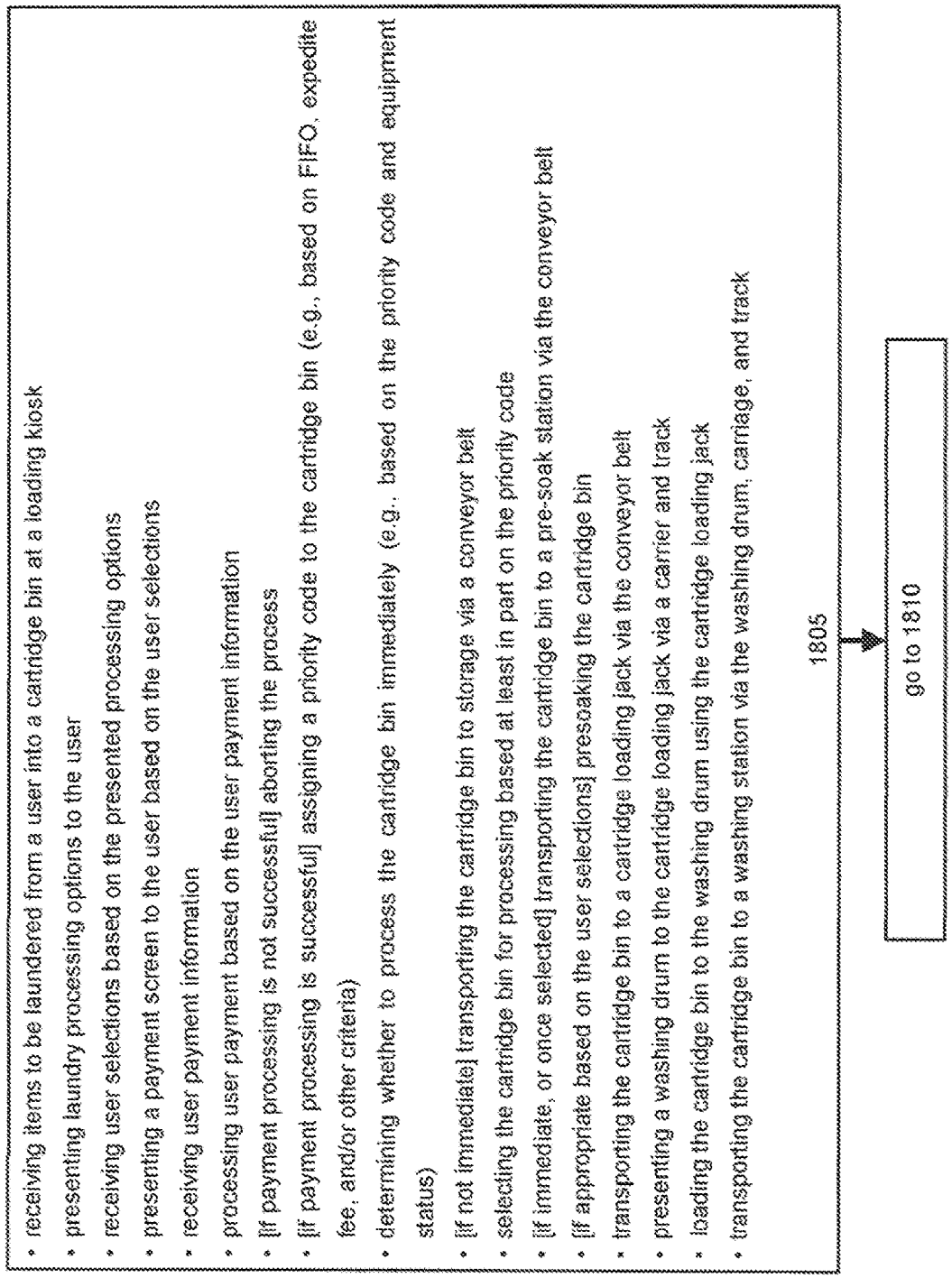

FIG. 17 illustrates data collection and commands that may be associated with a variety of user types. Preferably, the laundry system supports fully automated payment processing, individualized process control, item tracking, and secure delivery of laundered goods. But a wide range of automated and semi-automated controls are possible.

Processes

From the perspective of the laundry system, the process may include one or more of the following steps (illustrated as process step groups 1805 and 1810 in FIGS. 18A and 18B, respectively):
  receiving items to be laundered from a user into a cartridge bin at a loading kiosk
  presenting laundry processing options to the user
  receiving user selections based on the presented processing options
  presenting a payment screen to the user based on the user selections
  receiving user payment information
  processing user payment based on the user payment information
  [if payment processing is not successful] aborting the process
  [if payment processing is successful] assigning a priority code to the cartridge bin (e.g., based on FIFO, expedite fee, and/or other criteria)
  determining whether to process the cartridge bin immediately (e.g., based on the priority code and equipment status)
  [if not immediate] transporting the cartridge bin to storage via a conveyor belt
  selecting the cartridge bin for processing based at least in part on the priority code
  [if immediate, or once selected] transporting the cartridge bin to a pre-soak station via the conveyor belt
  [if appropriate based on the user selections] presoaking the cartridge bin
  transporting the cartridge bin to a cartridge loading jack via the conveyor belt
  presenting a washing drum to the cartridge loading jack via a carrier and track
  loading the cartridge bin to the washing drum using the cartridge loading jack
  transporting the cartridge bin to a washing station via the washing drum, carriage, and track
  tilting the washing drum (for instance at an angle 30-45 degrees from horizontal to retain water)
  injecting water solution (quantity, temperature, and additives based on the user selections)
  agitating (inner drum+cartridge bin), rinsing, and high-speed spinning (inner drum+cartridge bin) based on the user selections
  [if appropriate based on the user selections] transporting the cartridge bin to a drying station via the washing drum, carriage, and track (preferably on an upper portion of the track)
  [if appropriate based on the user selections] coupling hot air to the washing drum
  begin low-speed tumble (inner drum+cartridge bin)
  decoupling hot air from the washing drum based on measured humidity
  transporting the cartridge bin to a discharge station via the washing drum, carriage, and track
  terminating the tumbling
  discharging the cartridge bin to the conveyor belt (to include tilting the washing drum)
  transporting the cartridge bin to storage via the conveyor belt
  notifying the user that laundry is complete
  receiving a laundry retrieval command from the user
  transporting the cartridge bin to the retrieval station via the conveyor belt From the perspective of an end user (i.e., a person wishing to launder clothing or other textiles), the process may include one or more of the following steps:
  loading items to be laundered into a cartridge bin at a loading kiosk
  receiving laundry processing options
  providing user selections based on the presented processing options
  receiving a payment screen
  providing payment information
  [if payment processing is not successful] receiving an error message
  [if payment processing is successful] receiving a confirmation message
  receiving a notice that laundry is complete
  sending a laundry retrieval command
  receiving the laundry at a retrieval station Summary Embodiments of the invention thus provide a system and method for laundering clothes or other textiles. Those skilled in the art can readily recognize that numerous variations and substitutions may be made in the invention, its use and its configuration to achieve substantially the same results as achieved by the embodiments described herein. Features disclosed in this specification could be combined in ways not expressly illustrated or discussed. Accordingly, there is no intention to limit the invention to the disclosed exemplary forms and applications. Many variations, modifications and alternative constructions fall within the scope and spirit of the disclosed invention.

I claim:

1. A system for processing textiles comprising:
   a plurality of cartridge bins, each of the plurality of cartridge bins configured to contain a batch of the textiles;
   a conveyor belt configured to transport each of the plurality of cartridge bins;
   a plurality of drums, each of the plurality of drums configured to contain one of the plurality of cartridge bins;
   a jack configured to transfer each of the plurality of cartridge bins from the conveyor belt to one of the plurality of drums;
   a plurality of carriages, each of the plurality of carriages configured to support one of the plurality of drums;
   at least one processing station; and
   a track configured to transport each of the plurality of carriages to and from the at least one processing station.

2. The system of claim 1, wherein each of the plurality of cartridge bins is cylindrical in shape with one open end, and wherein at least a portion of a wall in each of the plurality of cartridge bins is perforated.

3. The system of claim 1, wherein the drum includes an inner drum and an outer drum, the inner drum being configured to rotate about its longitudinal axis, the outer drum being pivotally connected to the carriage about a radial axis such that the drum can tilt about the radial axis.

4. The system of claim 1, wherein the each of the plurality of carriages includes a motor for advancing the carriage on the track.

5. The system of claim 4, the track and each of the plurality of carriages configured such that the track can supply electricity to each of the plurality of carriages.

6. The system of claim 1, wherein the at least one processing station includes a washing station and a drying station.

7. The system of claim 1, wherein the track is oval in shape and is disposed in a vertical orientation.

8. The system of claim 1, further comprising a hitch assembly, the hitch assembly being coupled between a first and a second of the plurality of carriages on the track.

9. The system of claim 1, further comprising a cartridge bin storage area coupled to the conveyor belt, the cartridge bin storage area configured to receive, store, and supply each of the plurality of cartridge bins.

10. The system of claim 1, further comprising a customer loading kiosk and a laundry retrieval station, the customer loading kiosk configured such that at least one of the plurality of cartridge bins can receive the batch of textiles from a customer, the laundry retrieval station configured to deliver the batch of textiles to the customer, the customer loading kiosk and the laundry retrieval station cooperating with the conveyor belt.

11. The system of claim 1 configured to perform a method, the method comprising the steps of:
   a. receiving the batch of the textiles from a user into one of the plurality of cartridge bins at a loading kiosk;
   b. presenting laundry processing options to the user;
   c. receiving user selections from the user based on the presented processing options;
   d. presenting a payment screen to the user based on the user selections;
   e. receiving user payment information;
   f. processing user payment based on the user payment information;
   g. transporting the one of the plurality of cartridge bins to the jack via the conveyor belt;
   h. loading the one of the plurality of cartridge bins into one of the plurality of drums using the jack;
   i. transporting the one of the plurality of cartridge bins to a washing station via the one of the plurality of drums, one of the plurality of carriages, and the track;
   j. executing a washing process;
   k. transporting the one of the plurality of cartridge bins to a drying station via the one of the plurality of drums, the one of the plurality of carriages, and the track;
   l. executing a drying process;
   m. transporting the one of the plurality of cartridge bins to a discharge station via the one of the plurality of drums, the one of the plurality of carriages, and the track;
   n. discharging the one of the plurality of cartridge bins to the conveyor belt;
   o. notifying the user that the batch of the textiles is complete;
   p. receiving a laundry retrieval command from the user; and
   q. transporting the one of the plurality of cartridge bins to a retrieval station via the conveyor belt in response to the laundry retrieval command.

12. The system of claim 11, the method further including, after step f and before step g:
   i. assigning a priority code to the one of the plurality of cartridge bins; and
   ii. determining whether to process the one of the plurality of cartridge bins based at least in part on the priority code.

13. The system of claim 11, the method further including, after step f and before step g, storing the one of the plurality of cartridge bins in a storage area.

14. The system of claim 11, the method further including, after step f and before step g:
   i. transporting the one of the plurality of cartridge bins to a pre-soak station via the conveyor belt; and
   ii. presoaking the one of the plurality of cartridge bins.

15. The system of claim 11, step j including:
   i. tilting the one of the plurality of drums;
   ii. injecting a water solution into the one of the plurality of drums based on the user selections;
   iii. agitating based on the user selections;
   iv. rinsing based on the user selections; and
   v. spinning based on the user selections.

16. The system of claim 11, step l including:
   i. coupling hot air to the one of the plurality of drums;
   ii. rotating the one of the plurality of cartridge bins; and
   iii. decoupling the hot air from the one of the plurality of drums based on a measured humidity value.

17. The system of claim 11, the method further including, after step o and before step q, storing the one of the plurality of cartridge bins in a storage area.

* * * * *